(No Model.)
C. W. & A. S. GAGE.
BAND SAW.
No. 441,655. Patented Dec. 2, 1890.
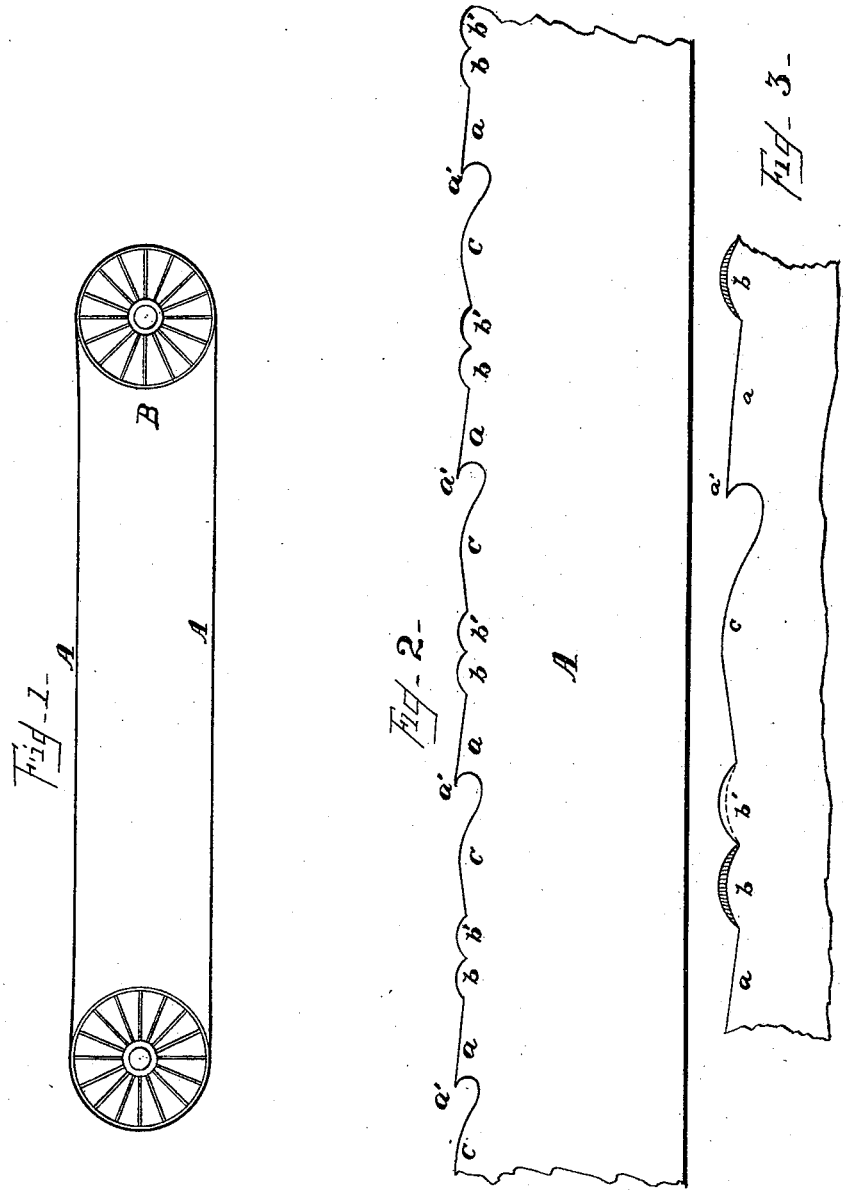
Witnesses:
L. M. Bartlett.
O. W. Johnson,
Inventors:
C. W. Gage
A. S. Gage.
By W. H. Bartlett
Atty.

UNITED STATES PATENT OFFICE.

CHARLES W. GAGE AND ADELBERT S. GAGE, OF HOMER, NEW YORK; EDWARD C. JOHNSON ADMINISTRATOR OF SAID CHARLES W. GAGE, DECEASED.

BAND-SAW.

SPECIFICATION forming part of Letters Patent No. 441,655, dated December 2, 1890.

Application filed June 5, 1890. Serial No. 354,316. (No model.)

*To all whom it may concern:*

Be it known that we, CHARLES W. GAGE and ADELBERT S. GAGE, residing at Homer, in the county of Cortland and State of New York, have invented certain new and useful Improvements in Band-Saws, of which the following is a specification, reference being had therein to the accompanying drawings.

This invention relates to band-saws, and particularly to the cutting-teeth of such saws.

The object of the invention is to produce a band-saw which shall cut easily and uniformly, and which shall produce a smooth cut and clear the kerf without clogging or slivering.

Figure 1 is a front elevation of a band-saw running on its pulleys. Fig. 2 is a plan or elevation of a broken piece of the band-saw, showing form of teeth. Fig. 3 is a similar view showing teeth enlarged.

A indicates the blade of a band-saw, and B the pulleys on which the saw runs. The saw is an endless band, as usual in saws of this class. The blade A has clearing-teeth $a$, all facing in one direction. These teeth have hooked ends $a'$, which are undercut at the front in curved form. The outer face of each clearing-tooth $a$ extends in a straight line (oblique to the back of the saw) to the base of tooth $b$, which follows. The clearing-tooth may thus be dressed by a flat file, and as the saw-plate is of uniform width the extension of the teeth from the back of the saw-plate can be easily and accurately gaged—a matter of importance in band-saws, since the backs of such saws are generally supported, and by this means the saw held up to its work. The edges of the teeth $a'$ are straight across the saw—that is, at right angles to the plane faces—there being no bevel to these clearing-teeth.

The marking or scoring teeth $b\ b'$ are arranged in pairs, one tooth $b$ being beveled on one side, and the next $b'$ on the opposite side or face. These teeth may have a slight set, but not enough to materially widen the saw-kerf. The curved edges of the teeth enter the wood with a scoring or draw cut. The teeth $b\ b'$ may project a trifle beyond the ends of the teeth $a'$, so that the scoring shall be assured before the clearance takes place. The blank or curved projection $c$ is preferably used between the cutting-teeth $b\ b'$ and the scoring-teeth. The projection $c$ prevents chatter. In case of breakage of one of the teeth $b\ b'$ the projection $c$ may be beveled to replace it.

The débris produced by this saw or cutter is more of the character of fibers of fine strings than sawdust, as usually known. The kerf is exceedingly narrow, so that the waste of material is almost nothing, and the surface of the lumber produced is almost as smooth as ordinary planed lumber. By reason of the narrow kerf and easy cutting-lines of the teeth the power required to drive the saw is very small.

What I claim is—

1. A band-saw having hooked clearing-teeth, all pointing in one direction, the back of each clearing-tooth extending in straight line to the base of the following scoring-tooth, said scoring-tooth having a rounded point and being beveled at one side, and a second rounded scoring-tooth following the first and beveled at the opposite side, a pair of said scoring-teeth following each clearing-tooth, substantially as described.

2. The band-saw blade having hooked clearing-teeth, all facing in one direction, a pair of rounded scoring-teeth beveled in opposite directions and following each clearing-tooth, and a rounded blank intervening between the scoring-teeth and the following clearing-teeth, substantially as described.

In testimony whereof I affix my signature in presence of two witnesses.

CHARLES W. GAGE.
ADELBERT S. GAGE.

Witnesses:
O. B. ANDREWS,
LESTER P. BENNETT.